P. E. HOLT.
DRAFT RIGGING.
APPLICATION FILED DEC. 7, 1916.

1,327,557.

Patented Jan. 6, 1920.

WITNESSES:
Charles Pickles
Thos. Castberg

INVENTOR
Pliny E. Holt
BY Strong & Townsend
ATTORNEYS

UNITED STATES PATENT OFFICE.

PLINY E. HOLT, OF STOCKTON, CALIFORNIA.

DRAFT-RIGGING.

1,327,557.  Specification of Letters Patent.  Patented Jan. 6, 1920.

Application filed December 7, 1916. Serial No. 135,527.

*To all whom it may concern:*

Be it known that I, PLINY E. HOLT, a citizen of the United States, residing at Stockton, in the county of San Joaquin and State of California, have invented new and useful Improvements in Draft-Rigging, of which the following is a specification.

This invention relates to draft riggings; and has for its object to provide such a device for implements or vehicles drawn by a tractor or other draft device, which will automatically steer the drawn vehicle in such a way as to cause it to track substantially with the draft vehicle at all times.

In draft rigging to which this invention relates, an implement or vehicle is hitched behind a tractor, or other draft vehicle, by means of a swinging draw-bar usually made long because of a desire to connect it well up toward the center of the tractor frame and to allow sufficient space between the tractor and the drawn element. Therefore, in turning corners the tractor swings about the pivotal connection between the rear end of the draw-bar and the drawn element, permitting the latter to turn an exceedingly short corner and fall out of tracking relation with the tractor. It is to prevent this that the present draft rigging is designed, and also to obtain in a simplified and improved manner the advantages of steering and controlling a drawn implement or vehicle as set forth in my prior Patent No. 1,140,823, dated May 25, 1915.

In its present form the draft rigging comprises, in addition to a swinging draw-bar connecting a draft vehicle with a drawn implement or vehicle, the provision of a steering truck for the rear end of the draw-bar in which the wheels are pivoted and automatically controlled by steering mechanism which has operative connections with the tractor, so that when the draft vehicle is turned, as in making a corner, the truck wheels are angled in a direction opposite to the turning of the draft vehicle, whereby to cause the rear end of the draw-bar to follow accurately in the center of the path of the draft vehicle and thus compel the drawn implement or vehicle to substantially track with the draft vehicle.

One form which my invention may assume is exemplified in the following description and illustrated in the accompanying drawing, in which—

Figure 1:
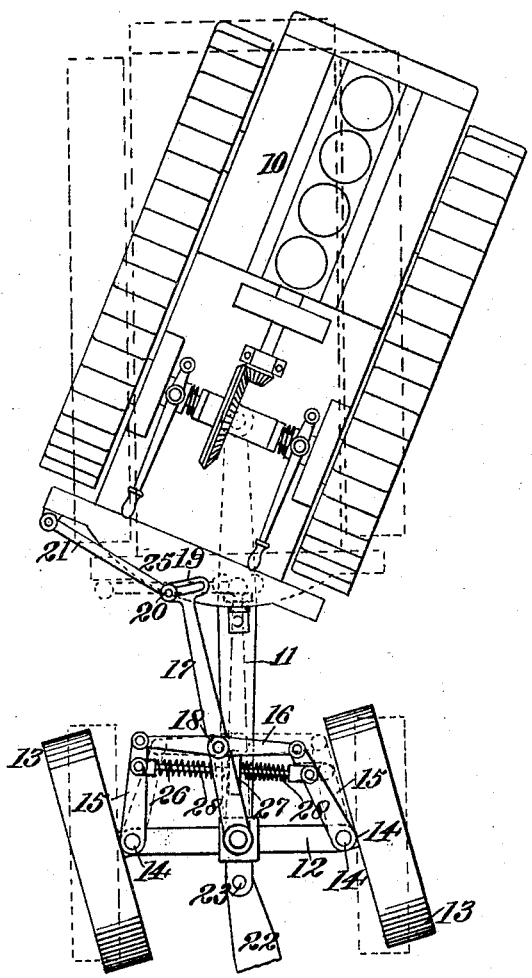
Figure 1 shows a plan view of a tractor equipped with a draft rigging embodying my invention.

In the drawings, a tractor 10, of any suitable form, is shown, to which is pivoted, centrally, a swinging draw-bar 11, preferably well up toward the center of the tractor frame to overcome the disadvantageous leverage present where the draw-bar is connected to the rear of the tractor frame. The rear end of the draw-bar connects rigidly with an axle-tree 12 of the steering truck which includes wheels 13 having their spindles pivoted to the axle-tree at 14 and provided with forwardly extending arms 15, forming with the spindles bell-cranks. The forward ends of the arms 15 are joined by a pivoted cross-bar 16, and a tongue 17 is pivoted centrally on the axle-tree and has a pivotal connection 18 with said cross-bar 16. The forward end of the tongue is provided with a yoke having a transverse slot 19 which receives a pin 20 on a swinging link 21, the latter pivoted to one side of the rear end of the tractor frame. A reach, tongue, or other draft device 22 is pivoted, as shown at 23, to a rear extension on the draft bar 11 or axle-tree for coupling an implement or vehicle not shown. Such agricultural implements as a plow, harvester, etc., may be drawn by or be a part with the member 22, or vehicles, such as wagons, single or *en train*, may be drawn thereby or be a part thereof.

Figure 2:
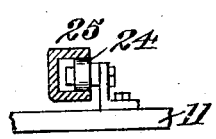
Fig. 2 shows a detail of the track and roller connections between the swinging draw-bar and the tractor frame embodied in the present draft rigging.

For supporting the draft bar 11 against longitudinal bending strains and also for overcoming friction between the same and the tractor frame, I interpose a roller 24 journaled on said bar and working in a channeled guide or trackway 25 formed upon or secured to the rear end of the tractor frame, as shown in detail in Fig. 2. This track and roller connection between the draw-bar and tractor frame will also prevent vertical movement of the rear end of the draw-bar which will insure a constant and steady engagement of the steering truck wheels with the ground.

In operation, turning of the tractor will take place about the pivotal connection between the tractor frame and draw-bar which will put them in the relative positions shown in Fig. 1, where the rear end of the tractor frame will have moved out of line with the steering truck, thus carrying the tongue 17, by means of the controlling link 21, to one side so that the wheels of the truck are angled in a direction opposite to the direction of turning of the tractor. The result is that the truck wheels are caused to follow faithfully in the track of the tractor, thus keeping the rear end of the draw-bar 11 centrally in the path of the tractor and compelling the drawn implement or vehicle to substantially follow the path of the tractor.

The truck wheels 13 should be allowed a certain amount of independent pivotal movement in order to dodge obstructions and if the controlling link 21 had a fixed pivot with the tongue 17 the turning action of the wheels would be entirely dependent on the swinging or turning of the tractor frame. Therefore, in event the truck wheels should hit an oblique obstruction they would not be deflected about their pivots 14 but the truck would be thrust bodily laterally. To avoid this I provide the slotted connection 19 for the tongue and controlling link 21 which allows sufficient play to permit the truck wheels to be deflected angularly about their pivots in such emergencies.

In order to keep the wheels in line with the draw-bar 11, I employ a neutralizing device comprising a cross-rod 26 pivoted to the bell-crank arms 15 and extending through an apertured lug 27 on the draw-bar 11, with a pressure spring 28 between each end of the rod 26 and the lug. The wheels are thus yieldingly held in parallelism with the draw-bar 11 or more conveniently in "neutral" position.

It is important to note that the connection between the draft bar 11 and the tractor frame is a freely swinging one. Therefore, the steering of the truck is automatic, being controlled entirely by the change in relative positions between the tractor frame and the draw-bar when the tractor is turning a corner. If the draw-bar 11 and tractor frame were not freely movable relatively this automatic steering of the truck would be lost.

A point in connection with the present truck which distinguishes it from couplings of front and rear wheels of a vehicle in a manner to effect a tracking of the same is that the tracking of the present truck with the tractor is a secondary matter, the prime function of the truck being to steer an implement or vehicle drawn by the tractor and which is connected to the draw-bar 11. It will be seen that without the assistance of the steering truck the rear end of the draw-bar would swing inwardly in turning and allow the implement or vehicle connected thereto to turn a much shorter corner than the tractor. I, therefore, term this an automatic steering truck in contradistinction to mere trailer trucks.

This particular draft mechanism has been designed for special use in connection with traction engines which are supported upon a pair of endless, flexible self-laying tracks, as indicated in Fig. 1; the steering of the traction engine being effected by slipping one or the other of the clutches 30 through operation of the hand levers 31, to cause one or the other of the tracks 32 to travel faster or slower than the other track. This mechanism enables plows and harvesters to make sharp turns and also to work into corners of fields, and also to operate among and around trees in plowing, harrowing, etc.

Various changes in the construction and arrangement of the several parts herein shown and described may be employed without departing from the spirit of my invention as disclosed in the appended claims.

Having thus described my invention, what I claim and desire to secure by Letters Patent is—

1. The combination of a draft vehicle and a drawn element of a draft bar pivotally connected to said vehicle, an axle forming a part of said drawn element and rigidly secured to the opposite end of said draft bar, steering wheels on the opposite ends of said axle and yieldable means whereby variation in the relation of the draft bar to the vehicle will cause said steering wheels to be disposed to traverse the same path of travel as that described by the draft vehicle and means whereby the steering wheels will be yieldably held in their angular positions.

2. The combination with a draft vehicle and a drawn element, of a swinging draw-bar connecting the two, a pivot wheel truck for the rear end of the draw-bar, automatically operable steering connections between the wheels of the truck and the draft vehicle for causing said truck to follow in the path of the draft vehicle in turning, whereby to maintain the rear end of the draw-bar in the center of the path of the draft vehicle, said steering connections comprising a tongue pivoted to the axle-tree of the truck and having steering connections with the wheels of the truck, and connections between the tongue and the draft vehicle, including a swinging link and a compensating connection therefor, whereby limited flexing of the truck wheels is permitted.

3. The combination with a draft vehicle and a drawn element, of a swinging draw-bar connecting the two, a pivoted wheel truck for the rear end of the draw-bar, automatically operable steering connections between the wheels of the truck and the draft vehicle for causing said truck to follow in the path of the draft vehicle in turning, whereby to maintain the rear end of the draw-bar in the center of the path of the draft vehicle, said steering connections comprising a tongue pivoted to the axle-tree of the truck and having steering connections with the wheels of the truck, a swinging link connection between the tongue and the draft vehicle, slidable connections between the tongue and link to permit the wheels to flex independent of the turning of the draft vehicle, and yielding means for maintaining the wheels in neutral position.

4. The combination with a draft vehicle and a drawn element, of a swinging draw-bar pivotally connected to each, a pivot wheel truck having its axle-tree rigid with the rear end of said draw-bar, a tongue pivoted to the axle-tree, steering connections between the tongue and wheels of the truck, a swinging link connection between the tongue and draft vehicle operable to cause said truck wheels to turn in a direction opposite to the turning of the draft vehicle and compelling them to follow in the tracks thereof, and a compensating connection for said link, whereby limited flexing of the truck wheels is permitted.

5. In combination, a draft vehicle, a pivot wheel truck, a draw-bar pivoted to the draft vehicle and having a rigid connection at its rear end with the axle-tree of the truck, a tongue pivoted to the axle-tree and having steering connections with the wheels of the truck, connections between the tongue and draft vehicle for controlling the tongue to compel the wheels of the truck to track with the draft vehicle, said connections between the tongue and draft vehicle comprising means to permit independent flexing of the truck wheels, and means for maintaining said truck wheels in neutral position.

6. In combination, a draft vehicle, a pivot wheel truck, a draw-bar pivoted to the draft vehicle and having a rigid connection with the axle-tree of the truck, crank arms on the spindles of the truck wheels, a cross bar connecting said crank arms, a tongue pivoted to the axle-tree of the truck and to the cross bar and extending forwardly thereof for steering the said wheels, a swinging link connection between the forward end of the tongue and one side of the draft vehicle frame for controlling said tongue, whereby to automatically steer the truck wheels in a manner to cause them to follow the tracks of the draft vehicle, slotted connections between the tongue and swinging link to permit independent movement of the tongue, a cross-rod connected to the crank arms on the truck wheels and extending through an apertured lug on the draw-bar, and a pressure spring on opposite sides of said lug acting upon said cross-rod for yieldingly maintaining the truck wheels in neutral position.

In testimony whereof I have hereunto set my hand in the presence of two subscribing witnesses.

PLINY E. HOLT.

Witnesses:
R. E. MANN,
FRANK H. CHISHOLM.